United States Patent
Keithley

(10) Patent No.: US 7,538,905 B2
(45) Date of Patent: May 26, 2009

(54) RESOLUTION DOUBLING FOR PRINTER APPARATUS

(75) Inventor: Douglas Gene Keithley, Boise, ID (US)

(73) Assignee: Marvell International Technology Ltd. (BM)

( * ) Notice: Subject to any disclaimer, the term of this patent is extended or adjusted under 35 U.S.C. 154(b) by 923 days.

(21) Appl. No.: 10/976,937

(22) Filed: Oct. 29, 2004

(65) Prior Publication Data

US 2006/0092435 A1    May 4, 2006

(51) Int. Cl.
*G06K 15/02* (2006.01)
*G06F 15/00* (2006.01)

(52) U.S. Cl. .......................... 358/1.2; 358/1.9

(58) Field of Classification Search .................. 358/1.1, 358/1.2, 1.9, 1.4, 1.5, 1.6, 1.8, 3.07, 3.11, 358/3.12, 1.11, 1.13, 1.15, 1.16, 1.17, 1.18, 358/442, 443, 445, 451, 447, 448, 468, 444, 358/404, 407, 523; 382/298, 299, 300; 399/1, 399/8; 347/2, 3, 5, 14, 23

See application file for complete search history.

(56) References Cited

U.S. PATENT DOCUMENTS

| | | | |
|---|---|---|---|
| 5,134,495 A | 7/1992 | Frazier et al. | |
| 5,193,008 A | 3/1993 | Frazier et al. | |
| 5,270,728 A | 12/1993 | Lund et al. | |
| 5,515,480 A | 5/1996 | Frazier | |
| 5,704,019 A * | 12/1997 | Akiyama et al. | 358/1.1 |
| 5,926,616 A * | 7/1999 | Sato et al. | 358/1.2 |

* cited by examiner

*Primary Examiner*—Dov Popovici

(57) ABSTRACT

A printing apparatus comprises a memory storing a lookup table comprising tokens for converting image data having a first dots per inch (dpi) to image data having a second dpi. The printing apparatus comprises a processor configured to access the lookup table to convert an image having the first dpi to the second dpi, and a print engine configured to print the converted image at the second dpi.

30 Claims, 4 Drawing Sheets

RESOLUTION DOUBLING FOR PRINTER APPARATUS

BACKGROUND

Printers, such as ink-jet printers and laser printers, are utilizing increasingly higher resolutions to provide higher quality output. Typically, increasing the resolution of a printer results in substantially increasing the cost of the printer. One way to keep the cost of a printer down while still increasing the resolution of the printer is resolution doubling. Resolution doubling allows a printer having a native resolution lower than the resolution of an image to be printed to print the image while maintaining the quality of the higher resolution image. For example, resolution doubling allows a 600 dpi printer to print a 1200 dpi image, or allows a 300 dpi printer to print a 600 dpi image. The higher resolution image is printed on the lower resolution printer without substantially increasing the cost of the printer. In addition, the output of the lower resolution printer provides substantially the same quality output as that which can be provided by a higher resolution printer.

Typically, resolution doubling occurs in hardware in the printer. The printer receives an image, such as a 1200 dpi, 1-bit per pixel image, and converts the image into a 1200 dpi horizontal by 600 dpi vertical, multi-bit per pixel image. Resolution doubling is typically performed by analyzing a four row by three column window of pixel data. The windows of pixel data are compared to a small number (16-32) of templates. When a match is found, the center pixel of the window is replaced by a single P-code for controlling the print engine that outputs the image to media. The P-code controls the modulation of the laser in a laser printer during a single pixel period. The P-code represents a single pulse width value along with placement information (left, right, center, or split). In part, resolution doubling is accomplished in the horizontal direction by providing p-codes at twice the print engine's normal rate. In part, resolution doubling is accomplished in the vertical direction by modulating the laser such that two vertically adjacent pixels do not receive sufficient charge to attract toner by themselves, but the overlapping region between the two pixels does receive sufficient combined charge to attract toner.

In the horizontal direction, resolution doubling is typically accomplished by keeping the horizontal resolution at 1200 dpi by increasing the modulation of the laser in the horizontal direction. For a 1200 dpi 8.5 inch wide image using 8-bit P-codes, the resolution doubling hardware produces 10,200 8-bit P-codes for a total of 81,600 bits per pair of input rows. Processing of all these bits in hardware increases the cost of the printer.

SUMMARY

One aspect of the present invention provides a printing apparatus. The printing apparatus comprises a memory storing a lookup table comprising tokens for converting image data having a first dots per inch (dpi) to image data having a second dpi. The printing apparatus comprises a processor configured to access the lookup table to convert an image having the first dpi to the second dpi, and a print engine configured to print the converted image at the second dpi.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1A:
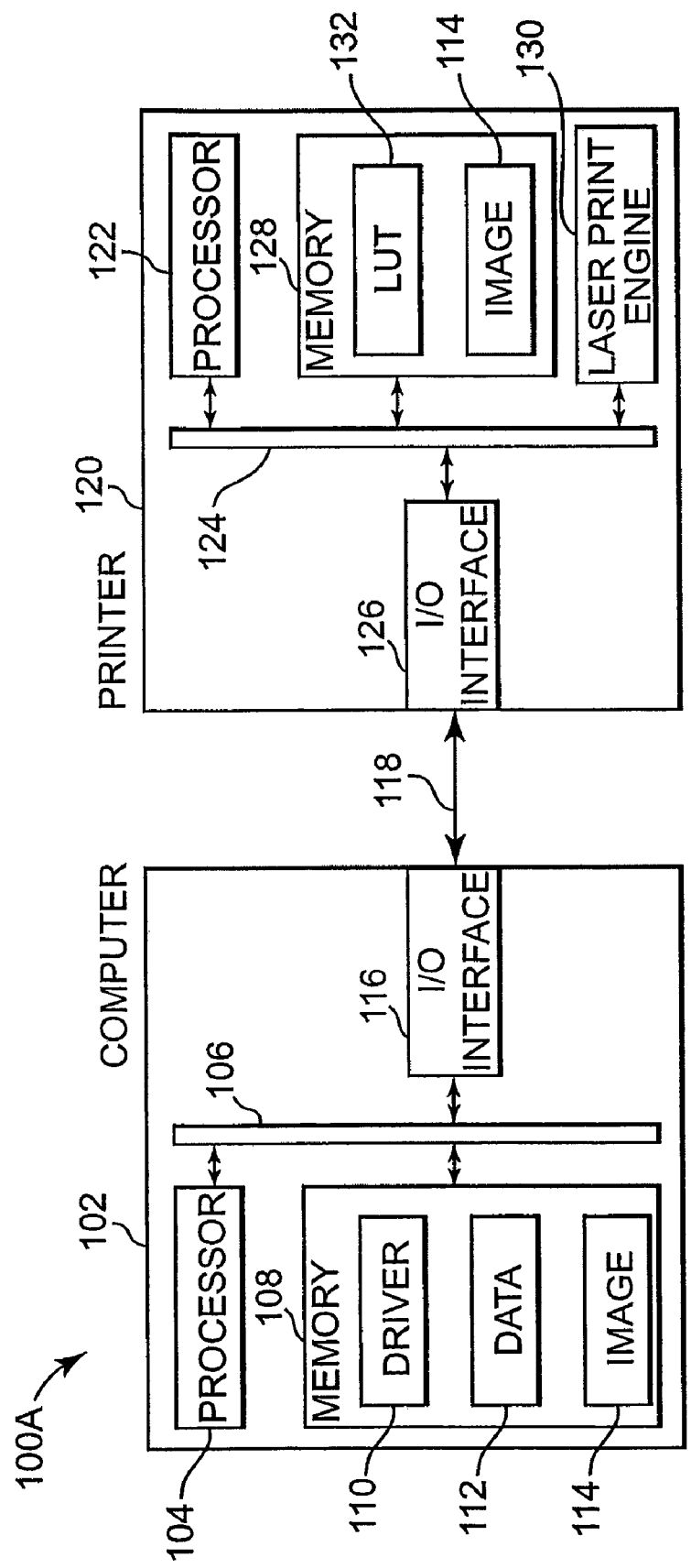
FIG. 1A is a block diagram illustrating one embodiment of a printing system.

FIG. 1A is a block diagram illustrating one embodiment of a printing system 100A. Printing system 100A includes a host or computer 102 and printer 120. In one embodiment, printer 120 is a laser printer or laser print apparatus. Printing system 100A is configured to perform resolution doubling on image data before the image data is printed.

Computer 102 includes processor 104, memory 108, and input/output (I/O) interface 116, which are communicatively coupled together via bus 106. Driver 110, data 112 to be printed, and image data 114 are stored in memory 108. In one embodiment, driver 110 is executed by processor 104 to render data 112 to be printed into image data 114. Data 112 to be printed may be any type of printable data, such as image files, word processing files, etc. In one embodiment, image data 114 comprises rows and columns, with one pixel defined at the intersection of each row and column. In one form of the invention, image data 114 includes a plurality of pixels, with each pixel being represented by a multi-bit value (i.e., each pixel is represented by an N-bit value, where N is greater than one). In another embodiment, each pixel in image data 114 is represented by a 2-bit value (e.g., black, white, and two gray levels). In another embodiment, each pixel is represented by a 1-bit value (e.g., black and white).

Printer 120 includes processor 122, I/O interface 126, memory 128, and laser print engine 130, which are communicatively coupled together via bus 124. In one embodiment, processor 122 is a custom processor for implementing custom instructions for performing resolution doubling.

I/O interface 126 of printer 120 is electrically coupled to I/O interface 116 of computer 102 through communication link 118. In one embodiment, I/O interfaces 116 and 126 are serial interfaces, such as universal serial bus (USB) interfaces, and communication link 118 is a USB cable. In another embodiment, I/O interfaces 116 and 126 are network interfaces, and communication link 118 is a network, such as a local area network. In other embodiments, other suitable types of interfaces and communication links can be used, including those for wireless communications.

After rendering data 112 into image data 114, computer 102 outputs the image data 114 to printer 120 via communication link 118. In one embodiment, image data 114 is compressed by computer 102 for transferring to printer 120, which decompresses image data 114 using firmware or dedicated hardware. In one embodiment, image data 114 comprises 1-bit per pixel image data having a dots per inch (dpi) resolution double the native resolution of printer 120. The received image data 114 is stored in memory 128 of printer 120. Processor 122 performs resolution doubling on image data 114 by converting the 1-bit per pixel image data having a dpi resolution double the native resolution of printer 120 into multi-bit tokens having a dpi resolution of the native resolution of printer 120. Processor 122 utilizes lookup table (LUT) 132 to convert the image data, as described in further detail below with reference to FIGS. 2-3. In general, lookup table 132 comprises table entries for replacing 1-bit per pixel center portions of windows of the image data with single multi-bit tokens. After resolution doubling is complete, laser print engine 130 retrieves the multi-bit token data from memory 128 and prints the data to media. In another embodiment, processor 104 performs resolution doubling on image 114 and passes the multi-bit token data to printer 120.

Figure 1B:
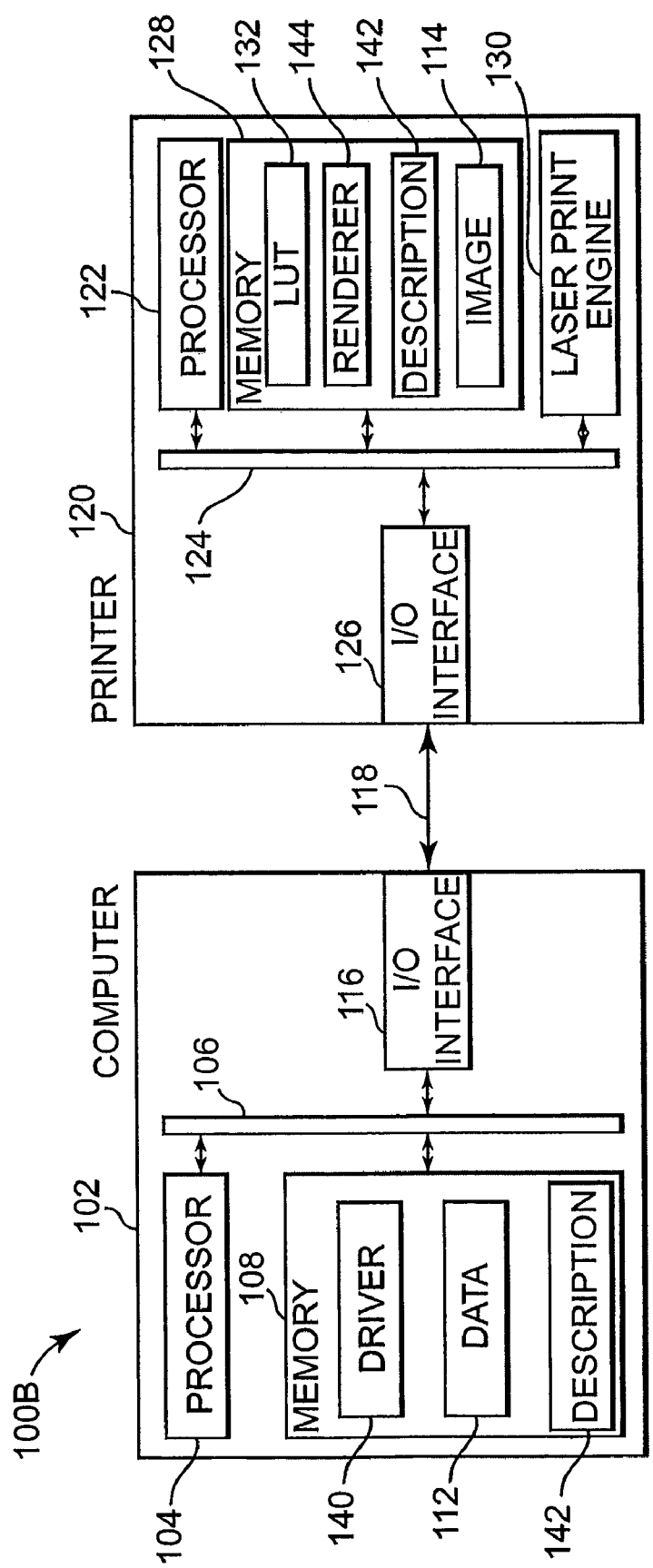
FIG. 1B is a block diagram illustrating another embodiment of a printing system.

FIG. 1B is a block diagram illustrating another embodiment of a printing system 100B. Printing system 100B includes similar hardware as printing system 100A. In system 100B, however, image data 114 is rendered by printer 120, rather than by computer 102. In one embodiment, driver 140 converts data 112 to be printed into a description file 142. In one form of the invention, driver 140 is a printer command language (PCL) driver for converting data 112 into a description file 142 that includes data and high level commands (e.g., place a Helvetica 12 point letter "Q" at location x, y on the page). Computer 102 transfers description file 142 to printer 120 via communication link 118, and printer 120 stores description file 142 in memory 128. In one embodiment, description file 142 is compressed by computer 102 for transferring to printer 120, which decompresses description file 142 using firmware or dedicated hardware.

Processor 122 then renders description file 142 into image data 114 using renderer 144. In one embodiment, printer 120 includes PCL firmware for rendering description file 142 into image data 114. In one embodiment, image data 114 comprises 1-bit per pixel image data having a dpi resolution double the native resolution of printer 120. The image data 114 is stored in memory 128 of printer 120. Processor 122 performs resolution doubling on image data 114 by converting the 1-bit per pixel image data having a dpi resolution double the native resolution of printer 120 into multi-bit tokens having a dpi resolution of the native resolution of printer 120. Processor 122 utilizes lookup table 132 to convert the image data, as described in further detail below with reference to FIGS. 2-3. After resolution doubling is complete, laser print engine 130 retrieves the multi-bit token data from memory 128 and prints the data to media.

Figure 2:
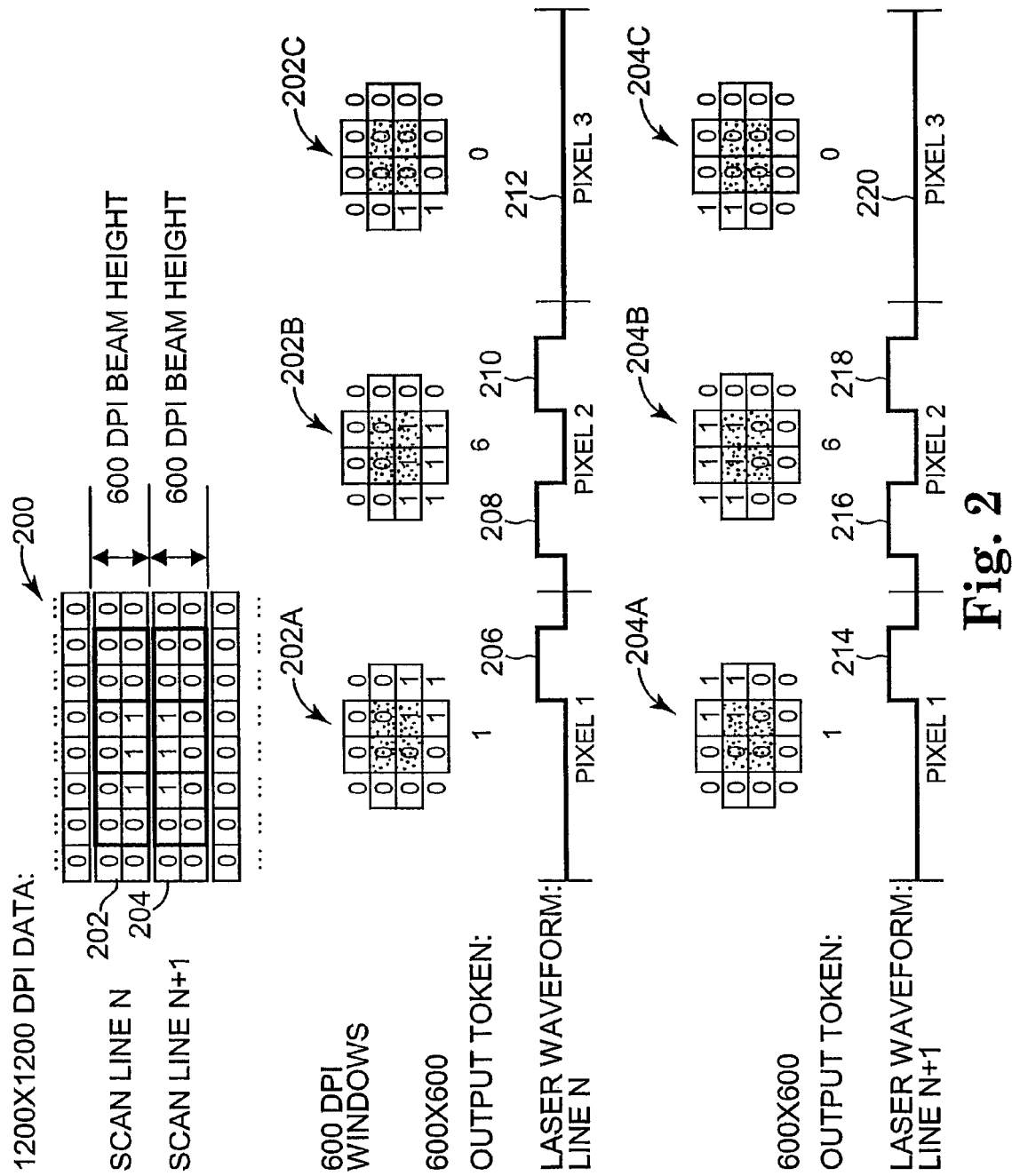
FIG. 2 is a diagram illustrating one embodiment of a sample of image data processed by the resolution doubling method of the present invention.

FIG. 2 is a diagram illustrating one embodiment of a sample 200 of image data processed by the resolution doubling method of the present invention. In this embodiment, sample data 200 comprises 1200 dpi resolution image data to be processed for printing on a printer having a 600 dpi native resolution. In other embodiments, any resolution image data can be processed for printing on a printer having a native resolution half of the resolution of the image data. For example, 600 dpi resolution image data can be processed for printing on a printer having a 300 dpi native resolution.

Sample data 200 includes 1200×1200 dpi, 1-bit per pixel data. Sample data 200 is divided into scan line N 202 and scan line N+1 204. Scan line N 202 and scan line N+1 204 each have a 600 dpi beam height. Portions of scan line N 202 and scan line N+1 204 are processed in succession by dividing scan line N 202 and scan line N+1 204 into windows, which are illustrated at 202A-202C and 204A-204C. Windows 202A-202C of scan line N 202 and windows 204A-204C of scan line N+1 204 each comprise four rows and four columns of 1-bit per pixel image data. In one embodiment, windows 202A-202C and 204A-204C each comprise four rows and four columns, excluding the four corner pixels, of 1-bit per pixel image data. Each window includes the four center pixels (indicated by shading) from scan line N 202 and scan line N+1 204, respectively.

Each window 202A-202C and 204A-204C is compared to table entries stored in lookup table 132 to find a match. In one embodiment, the input window data is used as the indexing address into lookup table 132 and the resulting output is the desired replacement token. Lookup table 132 comprises table entries including all possible combinations for the 1-bit per pixel values for windows 202A-202C and 204A-204C. In one embodiment, where a four row by four column window including the corner pixels is used, there are 64k table entries in lookup table 132. In another embodiment, where the corner pixels are excluded from the windows, there are 4k table entries in lookup table 132. Reducing the number of table entries may improve the performance and reduce the cost of printer 120 by reducing the size memory of 128.

Each table entry includes a corresponding multi-bit token that replaces the center four 1-bit per pixel values of each window 202A-202C and 204A-204C with a single pixel value. In one embodiment, the token is a 4-bit value, 5-bit value, 6-bit value, 7-bit value, 8-bit value, or other suitable number of bits. The token value controls the modulation of the laser of laser print engine 130 to output the image data at the native resolution of the printer while maintaining the quality of the original higher resolution image. Each token value represents the laser modulation for a single native-resolution pixel, such as laser off, full laser on, one pulse, two pulses, or a multitude of pulses within the pixel. The number of laser modulation choices can increase as the bit length of the token is increased.

In this embodiment, window 202A is compared to the table entries in lookup table 132 and determined to have a token value of one. The token value of one replaces the center four pixels of window 202A. The token value is stored in memory 128 for modulating the laser in pixel one for scan line N 202 when the resolution doubled sample data 200 is printed by laser print engine 130. The token value of one modulates the laser to form a single pulse on the right side of pixel one for scan line N 202, as indicated at 206.

The center four pixels of window 202B are adjacent to the center four pixels of window 202A on scan line N 202. Window 202B is compared to the table entries in lookup table 132 and determined to have a token value of six. The token value of six replaces the center four pixels of window 202B. The token value is stored in memory 128 for modulating the laser in pixel two for scan line N 202 when the resolution doubled sample data 200 is printed by laser print engine 130. The token value of six modulates the laser to form two pulses in pixel two for scan line N 202, as indicated at 208 and 210.

The center four pixels of window 202C are adjacent to the center four pixels of window 202B on scan line N 202. Window 202C is compared to the table entries in lookup table 132 and determined to have a token value of zero. The token value of zero replaces the center four pixels of window 202C. The token value is stored in memory 128 for modulating the laser in pixel three for scan line N 202 when the resolution doubled sample data 200 is printed by laser print engine 130. The token value of zero turns the laser off in pixel three for scan line N 202, as indicated at 212.

The center four pixels of window 204A are adjacent to the center four pixels of window 202A. Window 204A is compared to the table entries in lookup table 132 and determined to have a token value of one. The token value of one replaces the center four pixels of window 204A. The token value is stored in memory 128 for modulating the laser in pixel one for scan line N+1 204 when the resolution doubled sample data 200 is printed by laser print engine 130. The token value of one modulates the laser to form a single pulse on the right side of pixel one for scan line N+1, as indicated at 214.

The center four pixels of window 204B are adjacent to the center four pixels of window 204A on scan line N+1 204. Window 204A is compared to the table entries in lookup table 132 and determined to have a token value of six. The token value of six replaces the center four pixels of window 204B. The token value is stored in memory 128 for modulating the laser in pixel two for scan line N+1 204 when the resolution doubled sample data 200 is printed by laser print engine 130. The token value of six modulates the laser to form two pulses in pixel two for scan line N+1 204, as indicated at 216 and 218.

The center four pixels of window 204C are adjacent to the center four pixels of window 204B on scan line N+1 204. Window 204C is compared to the table entries in lookup table 132 and determined to have a token value of zero. The token value of zero replaces the center four pixels of window 204C. The token value is stored in memory 128 for modulating the laser in pixel three for scan line N+1 204 when the resolution doubled sample data 200 is printed by laser print engine 130. The token value of zero turns the laser off in pixel three for scan line N+1 204, as indicated at 220.

Therefore, according the to present invention, a 1200 dpi 8.5 inch wide image is converted to a 600 dpi image using 4-bit tokens, resulting in 5,100 4-bit tokens for a total of 20,400 bits per pair of input rows. This is one fourth the number of bits used by the prior art. In the prior art, 1200×1200×1 bit data is converted to 1200×600×8 bit data, resulting in four times as many bits. In the current invention, 1200×1200×1 bit data is converted to 600×600×4 bit data, resulting in no increase in bits.

Figure 3:
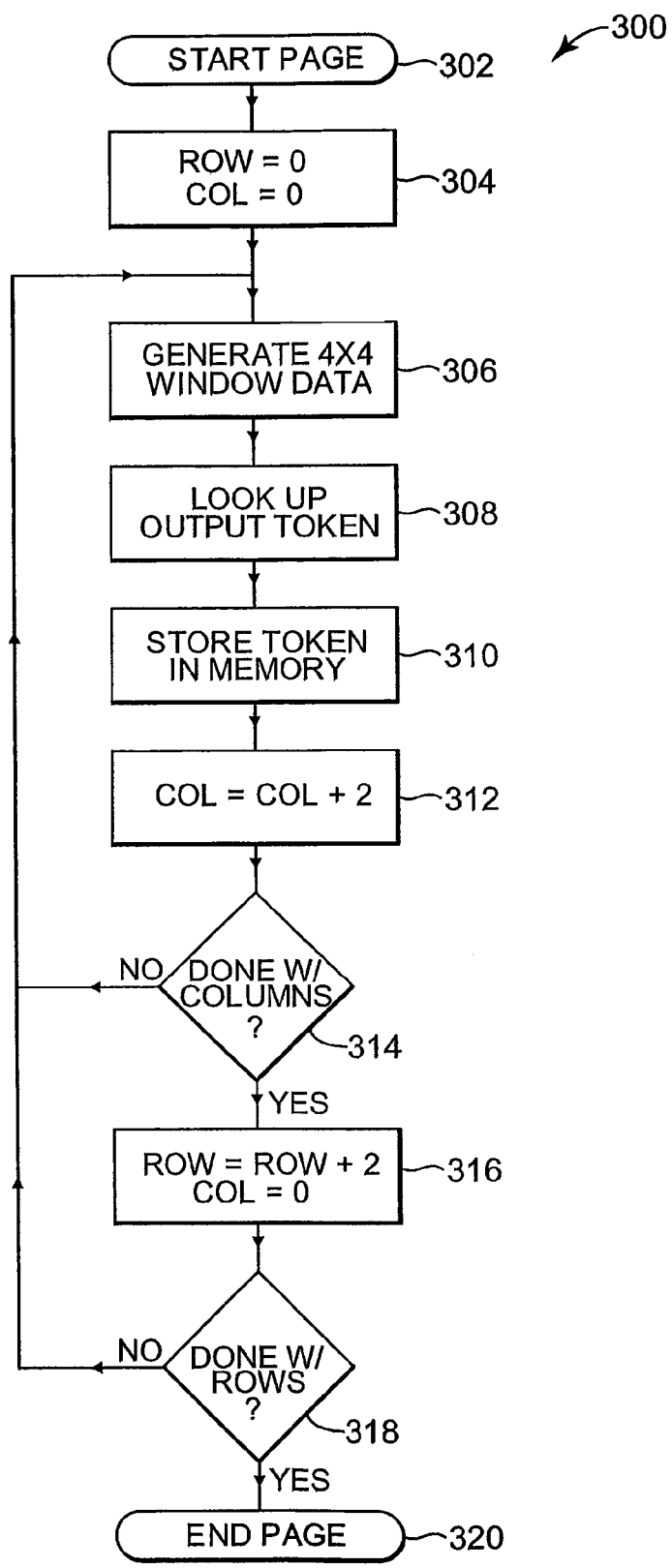
FIG. 3 is a flow diagram illustrating one embodiment of a method for performing resolution doubling.

FIG. 3 is a flow diagram illustrating one embodiment of a method for performing resolution doubling. At 302, processor 122 begins processing a page of image data 114. At 304, the row (Row) of the page of image data 114 is set equal to zero and the column (Col) of the page of image data 114 is set equal to zero. At 306, processor 122 generates a four Row by four Col data window at the selected Row and Col. In one embodiment, the corner pixels of the four Row by four Col data window are excluded. At 308, processor 122 matches the data window to a table entry in lookup table 132 and retrieves the corresponding token for the data window. At 310, processor 122 stores the token in memory 128. At 312, processor 122 increments Col by two.

At 314, processor 122 determines whether all the columns of the page of image data 114 have been processed. If all the columns of the page of image data 114 have not been processed, then control returns to block 306 where the next four Row by four Col data window is generated for processing. If all the columns of the page of image data 114 have been processed, then at 316, Row is incremented by two and Col is set equal to zero. At 318, processor 122 determines whether all the rows of the page of image data 114 have been processed. If all the rows of the page of image data 114 have not been processed, then control returns to block 306 where the next four Row by four Col data window is generated for processing. If all the rows of the page of image data 114 have been processed, then at 320, page processing is complete.

Once page processing is complete, the stored tokens are passed to laser print engine 130 to print the resolution doubled image data 114. Although the flow diagram of FIG. 3 illustrates processing columns of image data 114 first, other processing orientations, such as the rows first, can be used.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A printing apparatus comprising:
   a memory comprising image resolution conversion data for converting image data having a first resolution to image data having a second resolution;
   a processor configured to access the image resolution conversion data and convert the image data having the first resolution to the image data having the second resolution, wherein the second resolution has a lower pixel count and a higher bit per pixel ratio than the first resolution; and
   a print engine in communication with the processor and configured to print at the second resolution.

2. The printing apparatus of claim 1, wherein the processor is configured to generate a data window in the image data having the first resolution and replace only a portion of the data window with data from the image resolution conversion data.

3. The printing apparatus of claim 2, wherein the data window comprises data in the first resolution for four rows by four columns of pixels.

4. The printing apparatus of claim 2, wherein the data window comprises data in the first resolution for four rows by four columns of pixels excluding corner pixels.

5. The printing apparatus of claim 2, wherein the portion of the data window comprises data in the first resolution for four pixels in a center of the data window.

6. The printing apparatus of claim 1, wherein the image resolution conversion data comprises a plurality of multi-bit tokens, each multi-bit token associated with a pattern of 1-bit per pixel image data.

7. The printing apparatus of claim 6, wherein each of the plurality of multi-bit tokens comprise a bit value in a range of 4-bits to 8-bits.

8. The printing apparatus of claim 2, wherein the image resolution conversion data comprises a lookup table containing multi-bit tokens indexed by a plurality of expected combinations of pixel values in the data window.

9. The printing apparatus of claim 1, wherein the print engine comprises a laser print engine.

10. The printing apparatus of claim 9, wherein the laser print engine comprises a native resolution equal to the second resolution.

11. The printing apparatus of claim 1, wherein a pixel count of the second resolution is approximately one half of a pixel count of the first resolution.

12. A method for performing resolution doubling on a printing apparatus, the method comprising:
   receiving image data representative of an image having a first resolution;
   generating a first data window comprising a portion of the image data representative of the image;

looking up first image resolution conversion data to replace a portion of the first data window based on a combination of pixel values within the first data window; and storing the first image resolution conversion data in a memory for converting the image to a second resolution, wherein the second resolution has a lower pixel count and a higher bit per pixel ratio than the first resolution.

13. The method of claim 12, further comprising:

generating a second data window comprising a second portion of the image data representative of the image;

looking up a second image resolution conversion data to replace a portion of the second data window based on a combination of pixel values within the second data window;

storing the second image resolution conversion data in the memory for converting the image to the second resolution; and printing the image in the second resolution.

14. The method of claim 12, wherein looking up the first image resolution conversion data comprises looking up a multi-bit token to replace a plurality of 1-bit per pixel pixels of the first data window.

15. The method of claim 12, wherein the first resolution is 1200 dpi, and wherein the second resolution is 600 dpi.

16. The method of claim 12, wherein generating the first data window comprises selecting a portion of image data in the first resolution for comprising four rows by four columns of pixels.

17. The method of claim 12, wherein generating the first data window comprises selecting a portion of image data in the first resolution for comprising excluding corner pixels.

18. The method of claim 12, wherein looking up first image resolution conversion data to replace the portion of the first data window comprises replacing a center portion of the first data window with the first image resolution conversion data.

19. The method of claim 13, wherein printing the image comprises printing the image via a laser print engine having a native resolution equal to the second resolution.

20. A printing apparatus comprising:

means for storing image resolution conversion data to convert image data having a first resolution to image data having a second resolution different than the first resolution;

means for accessing the image resolution conversion data and converting the image data having the first resolution to the image data having the second resolution, wherein the second resolution has a lower pixel count and a higher bit per pixel ratio than the first resolution; and means for printing at the second resolution.

21. The printing apparatus of claim 20, wherein the means for accessing the image resolution conversion data and converting the image data generates a data window in the image data having the first resolution and replaces a portion of the data window with data from the image resolution conversion data.

22. The printing apparatus of claim 21, wherein the data window comprises data in the first resolution for four rows by four columns of pixels.

23. The printing apparatus of claim 21, wherein the data window comprises data in the first resolution for four rows by four columns of pixels excluding corner pixels.

24. The printing apparatus of claim 21, wherein the portion of the data window comprises data in the first resolution for four pixels in a center of the data window.

25. The printing apparatus of claim 20, wherein the image resolution conversion data comprises a plurality of multi-bit tokens, each multi-bit token associated with a pattern of 1-bit per pixel image data.

26. The printing apparatus of claim 25, wherein each of the plurality of multi-bit tokens comprise a bit value in a range of 4-bits to 8-bits.

27. The printing apparatus of claim 21, wherein the image resolution conversion data comprises a lookup table containing multi-bit tokens indexed by a plurality of expected combinations of pixel values in the data window.

28. The printing apparatus of claim 20, wherein the means for printing comprises a laser print engine having a native resolution equal to the second resolution.

29. The printing apparatus of claim 20, wherein a pixel count of the second resolution is approximately one half of a pixel count of the first resolution.

30. A printing apparatus comprising:

a memory storing a lookup table comprising tokens for converting image data having a first dots per inch (dpi) to image data having a second dpi;

a processor configured to access the lookup table to convert an image having the first dpi to the second dpi; and a print engine configured to print the converted image at the second dpi, wherein the second dpi is approximately one half of the first dpi in both a vertical direction and a horizontal direction.

* * * * *